US012315497B2

(12) United States Patent
Chang et al.

(10) Patent No.: US 12,315,497 B2
(45) Date of Patent: May 27, 2025

(54) INTENDED QUERY DETECTION USING E2E MODELING FOR CONTINUED CONVERSATION

(71) Applicant: Google LLC, Mountain View, CA (US)

(72) Inventors: Shuo-yiin Chang, Sunnyvale, CA (US); Guru Prakash Arumugam, Sunnyvale, CA (US); Zelin Wu, Jersey City, NJ (US); Tara N. Sainath, Jersey City, NJ (US); Bo Li, Fremont, CA (US); Qiao Liang, Mountain View, CA (US); Adam Stambler, Mountain View, CA (US); Shyam Upadhyay, Mountain View, CA (US); Manaal Faruqui, Mountain View, CA (US); Trevor Strohman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 256 days.

(21) Appl. No.: 18/186,872

(22) Filed: Mar. 20, 2023

(65) Prior Publication Data
US 2023/0335117 A1  Oct. 19, 2023

Related U.S. Application Data

(60) Provisional application No. 63/269,707, filed on Mar. 21, 2022.

(51) Int. Cl.
*G10L 15/16* (2006.01)
*G10L 15/06* (2013.01)
*G10L 15/22* (2006.01)

(52) U.S. Cl.
CPC ............ *G10L 15/16* (2013.01); *G10L 15/063* (2013.01); *G10L 15/22* (2013.01); *G10L 2015/223* (2013.01)

(58) Field of Classification Search
USPC ..................... 704/232, 231, 1–504
See application file for complete search history.

(56) References Cited

U.S. PATENT DOCUMENTS 10,366,158 B2 *  7/2019  Bellegarda ............... G06N 3/02
11,335,333 B2 *  5/2022  Han ......................... G10L 15/22
(Continued)

FOREIGN PATENT DOCUMENTS

WO    WO-2021117844 A1 *  6/2021  ............. G06N 3/044

OTHER PUBLICATIONS

International Search Authority and Written Opinion (EPO) for Application No. PCT/US2023/015703 dated May 30, 2023.
(Continued)

*Primary Examiner* — Marcus T Riley
(74) *Attorney, Agent, or Firm* — Honigman LLP; Brett A. Krueger; Grant Griffith (57) ABSTRACT

A method includes receiving, as input to a speech recognition model, audio data corresponding to a spoken utterance. The method also includes performing, using the speech recognition model, speech recognition on the audio data by, at each of a plurality of time steps, encoding, using an audio encoder, the audio data corresponding to the spoken utterance into a corresponding audio encoding, and decoding, using a speech recognition joint network, the corresponding audio encoding into a probability distribution over possible output labels. At each of the plurality of time steps, the method also includes determining, using an intended query (IQ) joint network configured to receive a label history representation associated with a sequence of non-blank symbols output by a final softmax layer, an intended query decision indicating whether or not the spoken utterance includes a query intended for a digital assistant.

20 Claims, 7 Drawing Sheets

(56) References Cited

U.S. PATENT DOCUMENTS

| | | | | |
|---|---|---|---|---|
| 11,475,880 | B2* | 10/2022 | Chang | G10L 15/14 |
| 11,538,461 | B1* | 12/2022 | Gupta | G10L 15/16 |
| 11,657,799 | B2* | 5/2023 | Zhao | G06N 3/044 |
| | | | | 704/232 |
| 11,688,392 | B2* | 6/2023 | Sharifi | G10L 15/22 |
| | | | | 704/254 |
| 11,721,323 | B2* | 8/2023 | Kang | G10L 15/02 |
| | | | | 704/231 |
| 11,776,529 | B2* | 10/2023 | Kang | G10L 15/16 |
| | | | | 704/235 |
| 11,783,811 | B2* | 10/2023 | Kurata | G06F 17/18 |
| | | | | 704/231 |
| 11,893,349 | B2* | 2/2024 | Gupta | G10L 13/08 |
| 11,908,458 | B2* | 2/2024 | Kurata | G10L 15/16 |
| 11,942,078 | B2* | 3/2024 | Saon | G10L 15/16 |
| 12,002,450 | B2* | 6/2024 | Li | G10L 25/78 |
| 12,014,730 | B2* | 6/2024 | Xu | G10L 15/08 |
| 12,073,826 | B2* | 8/2024 | Sharifi | G10L 15/05 |
| 12,165,634 | B2* | 12/2024 | Zhang | G10L 15/02 |
| 2020/0126538 | A1* | 4/2020 | Han | G10L 15/063 |
| 2020/0335091 | A1* | 10/2020 | Chang | G10L 15/16 |
| 2023/0335117 | A1* | 10/2023 | Chang | G10L 15/22 |

OTHER PUBLICATIONS

Martin Radfar et al: "FANS: Fusing ASR and NLU for on-device SLU", Arxiv.Org, Cornell University Library, 201 Olin Library Cornell University Ithaca, NY 14853, Oct. 31, 2021 (Oct. 31, 2021), XP091084555.

Milind Rao et al: "Speech to Semantics: Improve ASR and NLU Jointly via All-Neural Interfaces", Arxiv.Org, Cornell University Library, 201 Olin Library Cornell University Ithaca, NY 14853, Aug. 14, 2020 (Aug. 14, 2020), XP081879177, DOI: 10.21437/Interspeech. 2020-2976.

* cited by examiner

INTENDED QUERY DETECTION USING E2E MODELING FOR CONTINUED CONVERSATION

CROSS REFERENCE TO RELATED APPLICATIONS

This U.S. Patent Application claims priority under 35 U.S.C. § 119 (e) to U.S. Provisional Application 63/269,707, filed on Mar. 21, 2022. The disclosure of this prior application is considered part of the disclosure of this application and is hereby incorporated by reference in its entirety.

TECHNICAL FIELD

This disclosure relates to intended query detection using end-to-end (E2E) modeling for continued conversation.

BACKGROUND

A speech-enabled environment permits a user to only speak a query or command out loud and a digital assistant will field and answer the query and/or cause the command to be performed. A speech-enabled environment (e.g., home, workplace, school, etc.) can be implemented using a network of connected microphone devices distributed throughout various rooms and/or areas of the environment. Through such a network of microphones, a user has the power to orally query the digital assistant from essentially anywhere in the environment without the need to have a computer or other device in front of him/her or even nearby. For example, while cooking in the kitchen, a user might invoke the digital assistant, using a hotword such as "Okay Computer, please set a timer for 20-minutes" and, in response, the digital assistant will confirm that the timer has been set (e.g., in a form of a synthesized voice output) and then alert (e.g., in the form of an alarm or other audible alert from an acoustic speaker) the user once the timer lapses after 20-minutes. Often, the user may issue a follow-on query to the digital assistant However, requiring the user to repeat the hotword to address the digital assistant places a cognitive burden on the user and interrupts the flow of a continued conversation.

SUMMARY

One aspect of the disclosure provides a computer-implemented method that when executed on data processing hardware causes the data processing hardware to perform operations that include receiving, as input to a speech recognition model, audio data corresponding to a spoken utterance. The operations also include performing, using the speech recognition model, speech recognition on the audio data by, at each of a plurality of time steps, encoding, using an audio encoder, the audio data corresponding to the spoken utterance into a corresponding audio encoding, and decoding, using a speech recognition joint network, the corresponding audio encoding encoded by the audio encoder at the corresponding time step into a probability distribution over possible output labels for the spoken utterance at the corresponding time step. At each of the plurality of time steps, the operations also include determining, using an intended query (IQ) joint network configured to receive a label history representation associated with a sequence of non-blank symbols output by a final softmax layer, an intended query decision indicating whether or not the spoken utterance includes a query intended for a digital assistant interface.

Implementations of the disclosure may include one or more of the following optional features. In some implementations, the speech recognition model includes the audio encoder, the speech recognition joint network, and a prediction network. The prediction network is configured to receive the sequence of non-blank symbols output by the final softmax layer and generate the label history representation at each of the plurality of time steps. In these implementations, the speech recognition model is trained during a first training stage by optimizing the audio encoder, the speech recognition joint network, and the prediction network using a regular label sequence of wordpieces, and the IQ joint network is initialized with the joint network during a second training stage by freezing the audio encoder and the prediction network and fine-tuning the IQ joint network with an expanded label sequence of both word pieces and IQ tokens to teach the IQ joint network to learn how to predict a distribution of IQ tokens indicating whether or not an input utterances includes a query intended for the digital assistant interface. In these implementations, generating the label history representation for the corresponding sequence of non-blank symbols includes, for each non-blank symbol in the sequence of non-blank symbols received as input at each of the plurality of time steps, generating, by the prediction network, using a shared embedding matrix, an embedding of the corresponding non-blank symbol, assigning, by the prediction network, a respective position vector to the corresponding non-blank symbol, and weighting, by the prediction network, the embedding proportional to a similarity between the embedding and the respective position vector. Here, the operations also include generating, as output from the prediction network, a single embedding vector at the corresponding time step, the single embedding vector based on a weighted average of the weighted embeddings, the single embedding vector including the label history representation. Here, the prediction network may include a multi-headed attention mechanism, the multi-headed attention mechanism sharing the shared embedding matrix across each head of the multi-headed attention mechanism.

In some examples, the audio data corresponding to a spoken utterance is received during a current dialog session between a user and the digital assistant interface. In some implementations, the output labels include wordpieces, words, phonemes, or graphemes. In some examples, the audio encoder includes a causal encoder including one of a plurality of unidirectional long short-term memory (LSTM) layers, a plurality of conformer layers, or a plurality of transformer layers. In some implementations, the speech recognition model is trained using Hybrid Autoregressive Transducer Factorization. In some examples, the operations further include, when the intended query decision indicates that the spoken utterance includes a query intended for a digital assistant interface, providing a response to the received spoken utterance. Alternatively, when the intended query decision indicates that the spoken utterance does not include a query intended for a digital assistant interface, the operations further include discarding the received spoken utterance.

Another aspect of the disclosure provides a system including data processing hardware and memory hardware in communication with the data processing hardware. The memory hardware stores instructions that when executed by the data processing hardware cause the data processing hardware to perform operations that include receiving, as input to a speech recognition model, audio data corresponding to a spoken utterance. The operations also include performing, using the speech recognition model, speech recognition on the audio data by, at each of a plurality of time steps, encoding, using an audio encoder, the audio data corresponding to the spoken utterance into a corresponding audio encoding, and decoding, using a speech recognition joint network, the corresponding audio encoding encoded by the audio encoder at the corresponding time step into a probability distribution over possible output labels for the spoken utterance at the corresponding time step. At each of the plurality of time steps, the operations also include determining, using an intended query (IQ) joint network configured to receive a label history representation associated with a sequence of non-blank symbols output by a final softmax layer, an intended query decision indicating whether or not the spoken utterance includes a query intended for a digital assistant interface.

This aspect may include one or more of the following optional features. In some implementations, the speech recognition model includes the audio encoder, the speech recognition joint network, and a prediction network. The prediction network is configured to receive the sequence of non-blank symbols output by the final softmax layer and generate the label history representation at each of the plurality of time steps. In these implementations, the speech recognition model is trained during a first training stage by optimizing the audio encoder, the speech recognition joint network, and the prediction network using a regular label sequence of wordpieces, and the IQ joint network is initialized with the joint network during a second training stage by freezing the audio encoder and the prediction network and fine-tuning the IQ joint network with an expanded label sequence of both word pieces and IQ tokens to teach the IQ joint network to learn how to predict a distribution of IQ tokens indicating whether or not an input utterances includes a query intended for the digital assistant interface. In these implementations, generating the label history representation for the corresponding sequence of non-blank symbols includes, for each non-blank symbol in the sequence of non-blank symbols received as input at each of the plurality of time steps, generating, by the prediction network, using a shared embedding matrix, an embedding of the corresponding non-blank symbol, assigning, by the prediction network, a respective position vector to the corresponding non-blank symbol, and weighting, by the prediction network, the embedding proportional to a similarity between the embedding and the respective position vector. Here, the operations also include generating, as output from the prediction network, a single embedding vector at the corresponding time step, the single embedding vector based on a weighted average of the weighted embeddings, the single embedding vector including the label history representation. Here, the prediction network may include a multi-headed attention mechanism, the multi-headed attention mechanism sharing the shared embedding matrix across each head of the multi-headed attention mechanism.

In some examples, the audio data corresponding to a spoken utterance is received during a current dialog session between a user and the digital assistant interface. In some implementations, the output labels include wordpieces, words, phonemes, or graphemes. In some examples, the audio encoder includes a causal encoder including one of a plurality of unidirectional long short-term memory (LSTM) layers, a plurality of conformer layers, or a plurality of transformer layers. In some implementations, the speech recognition model is trained using Hybrid Autoregressive Transducer Factorization. In some examples, the operations further include, when the intended query decision indicates that the spoken utterance includes a query intended for a digital assistant interface, providing a response to the received spoken utterance. Alternatively, when the intended query decision indicates that the spoken utterance does not include a query intended for a digital assistant interface, the operations further include discarding the received spoken utterance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user's manner of interacting with an assistant-enabled device is designed to be primarily, if not exclusively, by means of voice input. Consequently, the assistant-enabled device must have some way of discerning when any given utterance in a surrounding environment is directed toward the device as opposed to being directed to an individual in the environment or originating from a non-human source (e.g., a television or music player). One way to accomplish this is to use a hotword, which by agreement among the users in the environment, is reserved as a predetermined word(s) that is spoken to invoke the attention of the device. In an example environment, the hotword used to invoke the assistant's attention are the words "OK computer." Consequently, each time the words "OK computer" are spoken, it is picked up by a microphone, conveyed to a hotword detector, which performs speech understanding techniques to determine whether the hotword was spoken and, if so, awaits an ensuing command or query. Accordingly, utterances directed at an assistant-enabled device take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In cases where the user continues the conversation with the assistant-enabled device, such as a mobile phone or smart speaker, the user's interaction with the phone or speaker may become awkward. The user may speak, "Ok computer, play my homework playlist." The phone or speaker may begin to play the first song on the playlist. The user may wish to advance to the next song and speak, "Ok computer, next." To advance to yet another song, the user may speak, "Ok computer, next," again. To alleviate the need to keep repeating the hotword before speaking a command, the assistant-enabled device may be configured to recognize/detect that the utterance "next" is directed to/intended for the assistant-enabled device to advance to the next song. In the example, the user can simply utter "next" to invoke the assistant-enabled device to trigger performance of the respective action instead of uttering "Ok computer, next." In contrast, the user may speak, "What did you think of the movie?" to another user in the environment. Here, the assistant-enabled device may recognize/detect that the query is not intended for the assistant-enabled device and, as such, does not respond to the query.

Implementations herein are directed toward integrating an automatic speech recognition (ASR) system with an intended query detection model that is configured and trained to detect intended queries and unintended queries that occur naturally in spoken utterances of natural conversational interactions. Example intended query detection models are built on top of, or integrated with, an end-to-end (E2E) ASR model, such as a recurrent neural network—transducer (RNN-T) model. In an example method, an ASR system receives, as input to an ASR model, audio data corresponding to a spoken utterance. At each of a plurality of time steps, the system performs, using the ASR model, speech recognition on the audio data by encoding, using an audio encoder, the audio data corresponding to the spoken utterance into a corresponding audio encoding, and decoding, using a speech recognition joint network, corresponding audio encoding encoded by the audio encoder at the corresponding time step into a probability distribution over output labels for the spoken utterance at the corresponding time step. At each of the plurality of time steps, an intended query (IQ) joint network that is configured to receive a label history representation associated with a sequence of non-blank symbols output by a final softmax layer determines an intended query decision indicating whether or not the spoken utterance includes a query intended for a digital assistant.

Figure 1A:
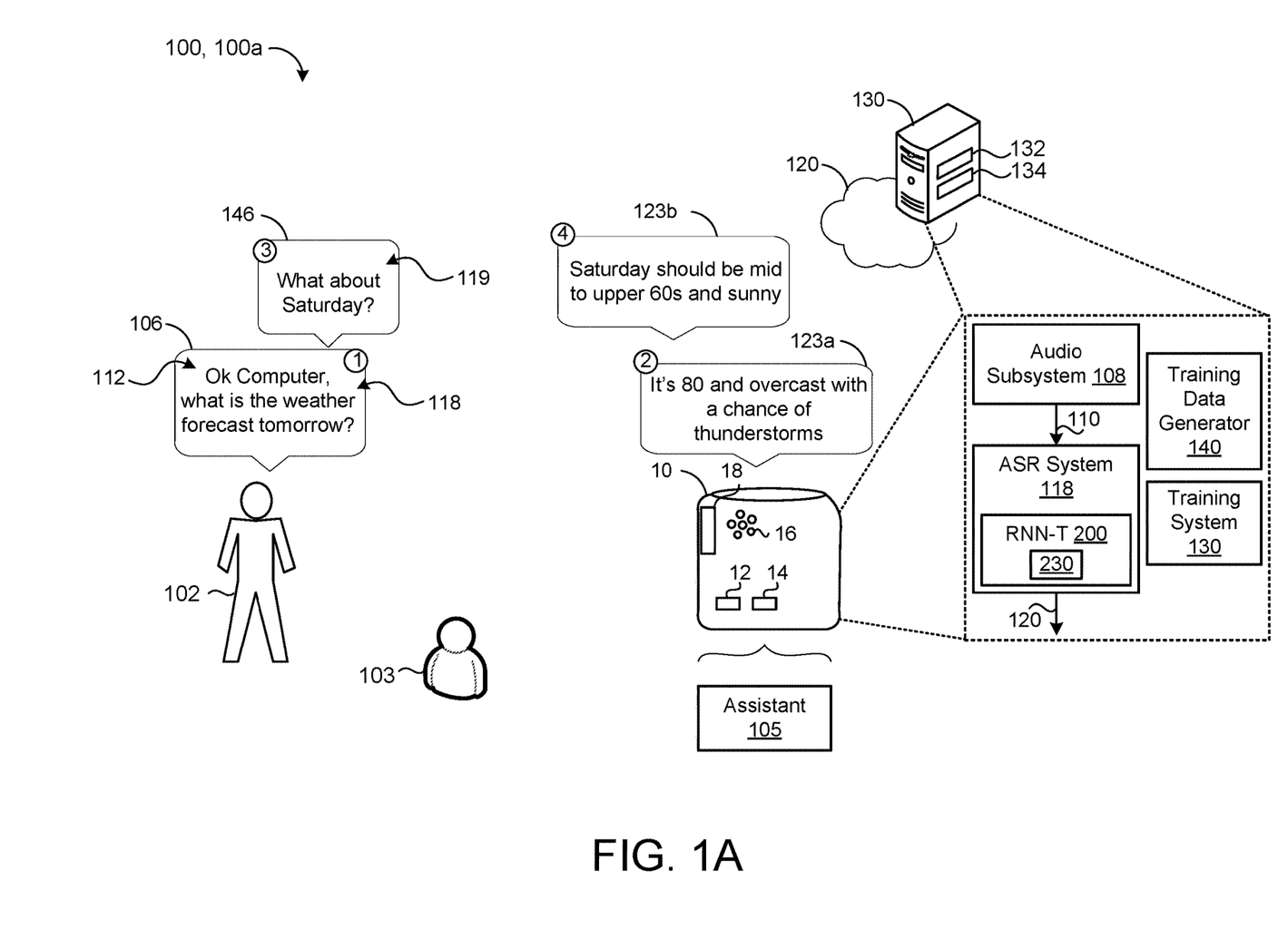
FIGS. 1A and 1B are schematic views of an example system including an automatic speech recognition (ASR) system that includes an intended query detector for transcribing spoken utterances.
Figure 1B:
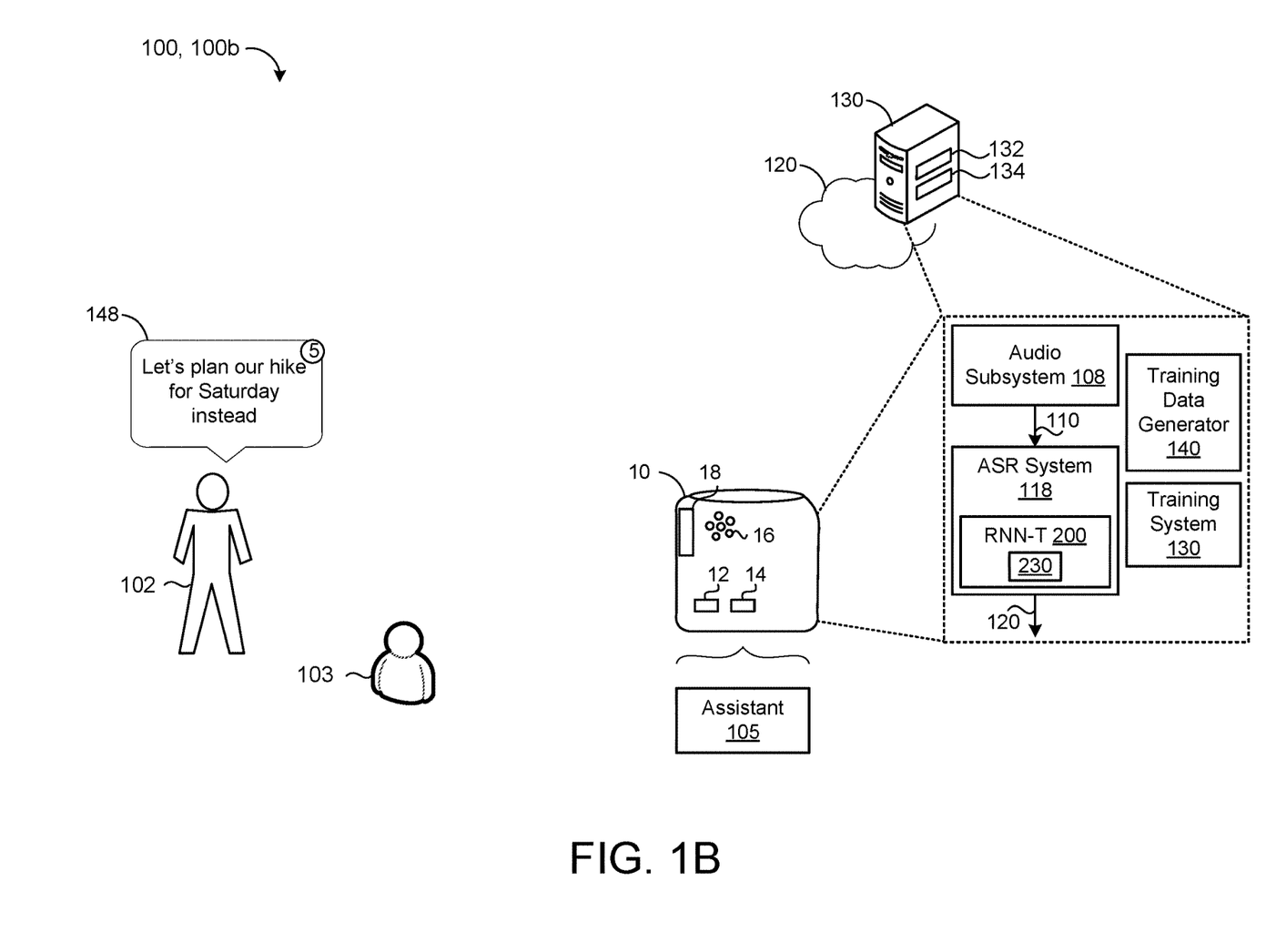

FIGS. 1A and 1B illustrate example systems 100a, 100b including an example speech environment. In the speech environment, a user's 104 manner of interacting with a computing device, such as a user device 10, may be through voice input. The user device 10 (also referred to generally as a device 10) is configured to capture sounds (e.g., streaming audio data) from one or more users 102 within the speech environment. Here, the streaming audio data may refer to a spoken utterance 106 by the user 102 that functions as an audible query, a command for the device 10, or an audible communication captured by the device 10. Speech-enabled systems of the device 10 may field the query or the command by answering the query and/or causing the command to be performed/fulfilled by one or more downstream applications.

The systems 100a, 100b include the user device 10 executing a digital assistant 105 (also referred to generally as a digital assistant interface) that users 102 of the device 10 may interact with during a dialog session between the user 102 and the digital assistant 105 by issuing queries including commands to perform an action. In the example shown, the user device 10 corresponds to a portable smart speaker that the users 102 may interact with. However, the user device 10 can include other computing devices, such as, without limitation, a smart phone, tablet, smart display, desktop/laptop, smart watch, smart glasses/headset, smart appliance, headphones, or vehicle infotainment device. The user device 10 includes data processing hardware 12 and memory hardware 14 storing instructions that when executed on the data processing hardware 12 cause the data processing hardware 12 to perform operations. In some examples, the user device 10 is configured to communicate with a remote system 130 via a network 120. The remote system 130 may include remote resources, such as remote data processing hardware 132 (e.g., remote servers or CPUs) and/or remote memory hardware 134 (e.g., remote databases or other storage hardware). The user device 10 includes an array of one or more microphones 16 configured to capture acoustic sounds such as speech directed toward the user device 10. The user device 10 may also include, or be in communication with, an audio output device (e.g., speaker) 18 that may output audio such as music and/or synthesized speech from the digital assistant 105. Additionally, the user device 10 may include, or be in communication with, one or more cameras configured to capture images within the environment and output image data.

In the speech environment, an automated speech recognition (ASR) system 118 implementing a recurrent neural network-transducer (RNN-T) model 200 including an intended query (IQ) joint network 230 resides on the user device 10 of the user 102 and/or on the remote system 130 in communication with the user device 10 via the network 120. The user device 10 and/or the remote system 130 also includes an audio subsystem 108 configured to receive the utterance 106 spoken by the user 102 and captured by the microphone 16, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the RNN-T model 200 receives, as input, the acoustic frames 110 corresponding to the utterance 106, and generates/predicts, as output, a corresponding transcription 120 of the utterance 106. In the example shown, the RNN-T model 200 may perform streaming speech recognition to produce partial transcriptions (e.g., streaming speech recognition results) 120 as the user speaks.

In the example shown in FIG. 1A, the user 102 interacts with a program or application (e.g., the digital assistant application 105) of the user device 10 that uses the ASR system 118. In this example, the user 102, during time 1, speaks a first utterance 106 ("Ok Computer, what is the weather forecast tomorrow"). The microphone 16 of the AED 104 receives the first utterance 106 and the audio subsystem 108 converts the first utterance 106 into the corresponding audio data 110 that corresponds to the first utterance 106. The initial processing of the audio data 110 may involve filtering the audio data 110 and converting the audio data 110 from an analog signal to a digital signal. As the audio subsystem 108 processes the audio data 110, the device 10 may store the audio data 110 in a buffer of the memory hardware 14 for additional processing. With the audio data 110 in the buffer, the device 110 may use a hotword detector (not shown) to detect whether the audio data 110 includes the hotword. The hotword detector is configured to identify hotwords that are included in the audio data 110 without performing speech recognition on the audio data 110.

In some implementations, the hotword detector is configured to identify hotwords that are in the initial portion of the first utterance 106. In this example, the hotword detector may determine that the first utterance 106 "Ok computer, what is the weather forecast tomorrow?" includes the hotword 112 "ok computer" if the hotword detector detects acoustic features in the input audio that are characteristic of the hotword 112. The acoustic features may be mel-frequency cepstral coefficients (MFCCs) that are representations of short-term power spectrums of the first query 106 or may be mel-scale filterbank energies for the first utterance 106. For example, the hotword detector may detect that the first utterance 106 "Ok computer, what is the weather forecast tomorrow?" includes the hotword 112 "ok computer" based on generating MFCCs from the audio data 110 and classifying that the MFCCs include MFCCs that are similar to MFCCs that are characteristic of the hotword "ok computer" as stored in a hotword model of the hotword detector. As another example, the hotword detector may detect that the first utterance 106 "Ok computer, what is the weather forecast tomorrow?" includes the hotword 112 "ok computer" based on generating mel-scale filterbank energies from the audio data 110 and classifying that the mel-scale filterbank energies include mel-scale filterbank energies that are similar to mel-scale filterbank energies that are characteristic of the hotword "ok computer" as stored in the hotword model of the hotword detector.

When the hotword detector determines that the audio data 110 that corresponds to the first utterance 106 includes the hotword 112, the device 10 may trigger a wake-up process to initiate speech recognition on the audio data 110 that corresponds to the first utterance 106. Here, because the device 10 detects that the audio data 110 includes the hotword 112, the device 10 determines that the first utterance 106 is intended for the device 10 (i.e., the digital assistant). The device 10 may utilize the remote resources (e.g., the remote system 130) to perform various functionality related to speech processing and/or synthesized playback communication. In some implementations, the ASR system 118 is located on the remote system 130 in addition to, or in lieu of, the device 10. Upon the hotword detector triggering the device 10 to wake-up responsive to detecting the hotword 112 in the first utterance 106, the user device 10 may transmit the acoustic frames 110 corresponding to the first utterance 106 to the remote system 130 via the network 120. Here, the device 10 may transmit the portion of the audio data 110 that includes the hotword 112 for the remote system 130 to confirm the presence of the hotword 112. Alternatively, the device 10 may transmit only the portion of the audio data 110 that corresponds to the portion of the first utterance 106 after the hotword 112 to the remote system 130, where the remote system 130 executes the ASR system 118 to perform speech recognition and returns a transcription 120 of the audio data 110 to the device 10. The device 10 may further include an NLU module (not shown) that performs semantic interpretation on the transcription 120 of the first utterance 106 to identify the command directed toward the device 10. Specifically, the NLU module identifies the words in the first utterance 106 identified by the ASR system 118, and performs semantic interpretation to identify any speech commands in the first utterance 106. The NLU module of the device 10 (and/or the remote system 130) may identify the words "what is the weather forecast tomorrow?" as a command specifying an action (i.e., look up the weather forecast for the user's location) for the digital assistant 105 to perform.

As shown, the user device 10, during time 2, generates synthesized speech 123a ("It's 80 and overcast with a chance of thunderstorms") in response to the first utterance 106. While the user device 10 audibly outputs the synthesized speech 123a, or shortly thereafter, the user 102, during time 3, speaks a second utterance 146 ("What about Saturday?"). Notably, the device 10 is operating in a continued conversation mode such that the ASR model 200 will continue to accept, and perform speech recognition processing on, any subsequent speech in the event the user 10 speaks any follow-on queries in a natural manner without requiring the user 10 to repeat speaking the hotword to invoke the ASR model 200. Continuing with this example, the RNN-T model 200, while receiving the acoustic frames 110 corresponding to the second utterance 146 as the user 102 speaks, performs speech recognition on the acoustic frame 110 to produce speech recognition results 120 (i.e., "what about Saturday?") corresponding to the second utterance 106. In the example shown, as the RNN-T model 200 performs streaming speak recognition on the acoustic frames 100, the IQ joint network 230 detects that the acoustic frames 110 corresponding to the second utterance 146 are indicative of an intended query rather than an unintended query (i.e., not directed to the user device 10), which the user 102 expects the user device 10 to respond to. Based on the IQ joint network 230 detecting that the second utterance includes a query intended for the digital assistant 105, at time 4, the digital assistant 105 generates and audibly outputs from the synthesized speech 123b ("Saturday should be mid to upper 60s and sunny") in response to the second utterance 146.

Continuing with this example, and with reference to FIG. 1B, at time 5 while the ASR model 200 is still accepting follow-on speech during and/or immediately after audible output of the synthesized speech 123b, the user 102 commences speaking a third utterance 148 ("Let's plan our hike for Saturday instead") and the RNN-T model 200 performs speech recognition on the acoustic data 110 corresponding to the third utterance 148 to produce partial speech recognition results 120. While the user 102 is still speaking, or after the user 102 has finished speaking the third utterance 148, the IQ joint network 230 jointly detects while the ASR model 200 is producing the partial speech recognition results 120, that the acoustic frames 110 corresponding to the third utterance 148 are indicative of an unintended query rather than an intended query. For example, as shown, the user 102 may speak the third utterance 148 to another user 103 within the environment. The third utterance 148 could include speech from background audio such as speech emanating from a media device. Here, because the IQ joint network 230 determines that the third utterance 148 is unintended for the device 10, the device 10 (i.e., the RNN-T model 200) may stop performing speech recognition on any remaining acoustic data 110, discard any partial speech recognition results 120, and/or suppress any action by the digital assistant 105. That is, continuing with the example, the IP joint network 230 is capable of determining that the third utterance 148 is unintended for the device 10 without requiring the ASR model 200 to complete performance of speech recognition on the entire third utterance 148 such that a hard microphone closing event may occur before the third utterance 148 is completed.

Figure 2:
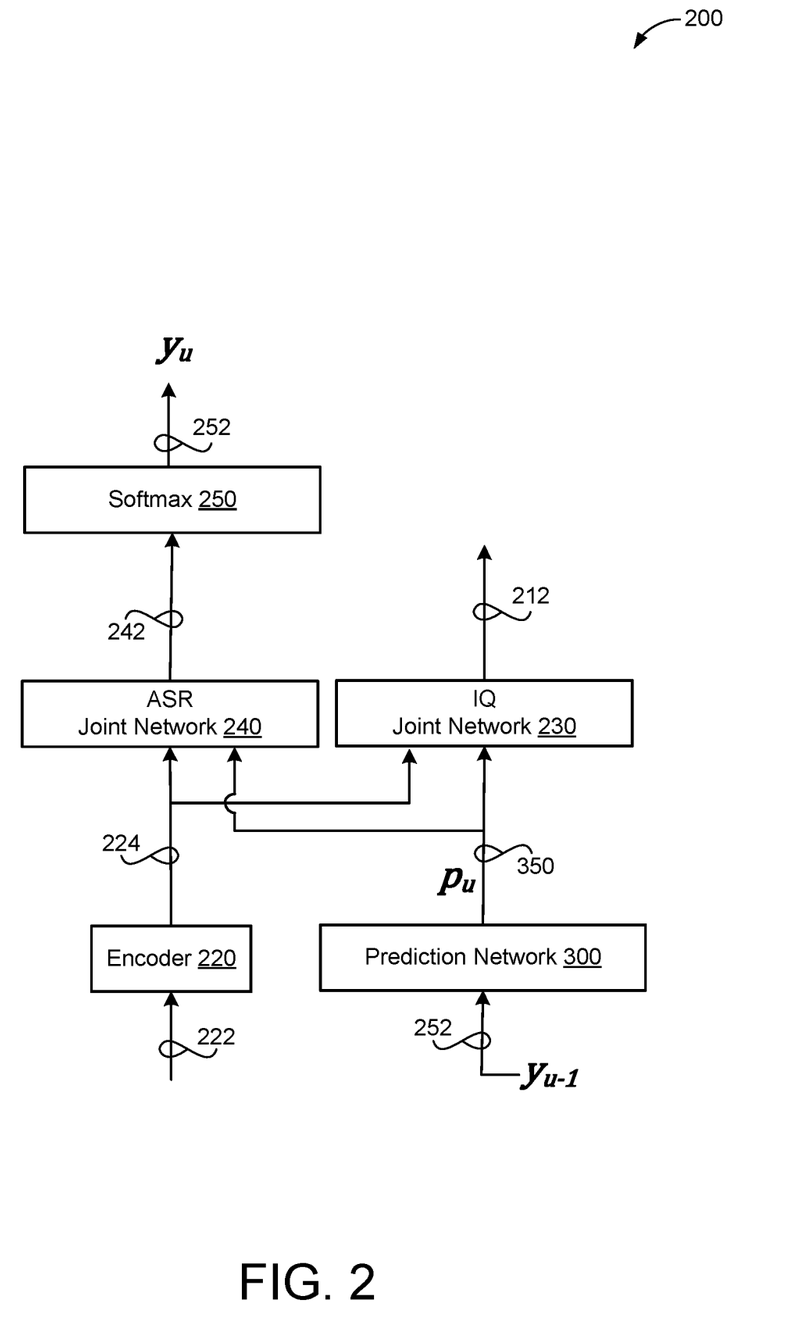
FIG. 2 is a schematic view of an example ASR system integrating an intended query detector.

FIG. 2 is a schematic view of an example RNN-T model 200 integrating the IQ joint network 230 for detecting intended queries in spoken utterances that are indicative that the speaker intends for the digital assistant 105 to perform an action/command associated with the spoken utterance. Notably, while FIG. 1A shows the user 102 speaking the first utterance 106 including the hotword 112 "ok computer," the RNN-T model 200 integrating the IQ joint network 230 may detect an intended query in a spoken utterance without the presence of a hotword 112. Example unintended queries include, but are not limited to, conversations between one or more users in the environment, synthesized speech generated by a different device within the environment, and the user speaking out loud (e.g., talking to themselves). These utterances can trigger conventional ASR systems to process queries where the digital assistant may interrupt the user with a response to the utterance, thereby leading to user frustration.

As shown, the RNN-T model 200 includes an encoder network 220, a prediction/decoder network 300, an ASR joint network 240 (i.e., a word piece joint network 240), and a final softmax output layer 250. The encoder network 220 (e.g., an audio encoder), which is roughly analogous to an acoustic model (AM) in a traditional ASR system, receives a sequence of feature vectors $x=(x_1, x_2, \ldots, x_t)$ 222, where $x_t \in \mathbb{R}_d$ (e.g., the audio data 110 of FIG. 1), and produces at each time step a corresponding audio encoding 224 (also generally referred to as an acoustic representation).

In the example shown, the prediction/decoder network 300 includes an LSTM-based prediction network that, like a language model (LM), processes a sequence of non-blank symbols $y_0, \ldots, Y_{u-1}$ 252 output so far by the softmax layer 250 into a label history representation 350 (also generally referred to as a dense or linguistic representation) representing a probability distribution of whether a current time step corresponds to a possible output label for the audio data 110.

Figure 3:
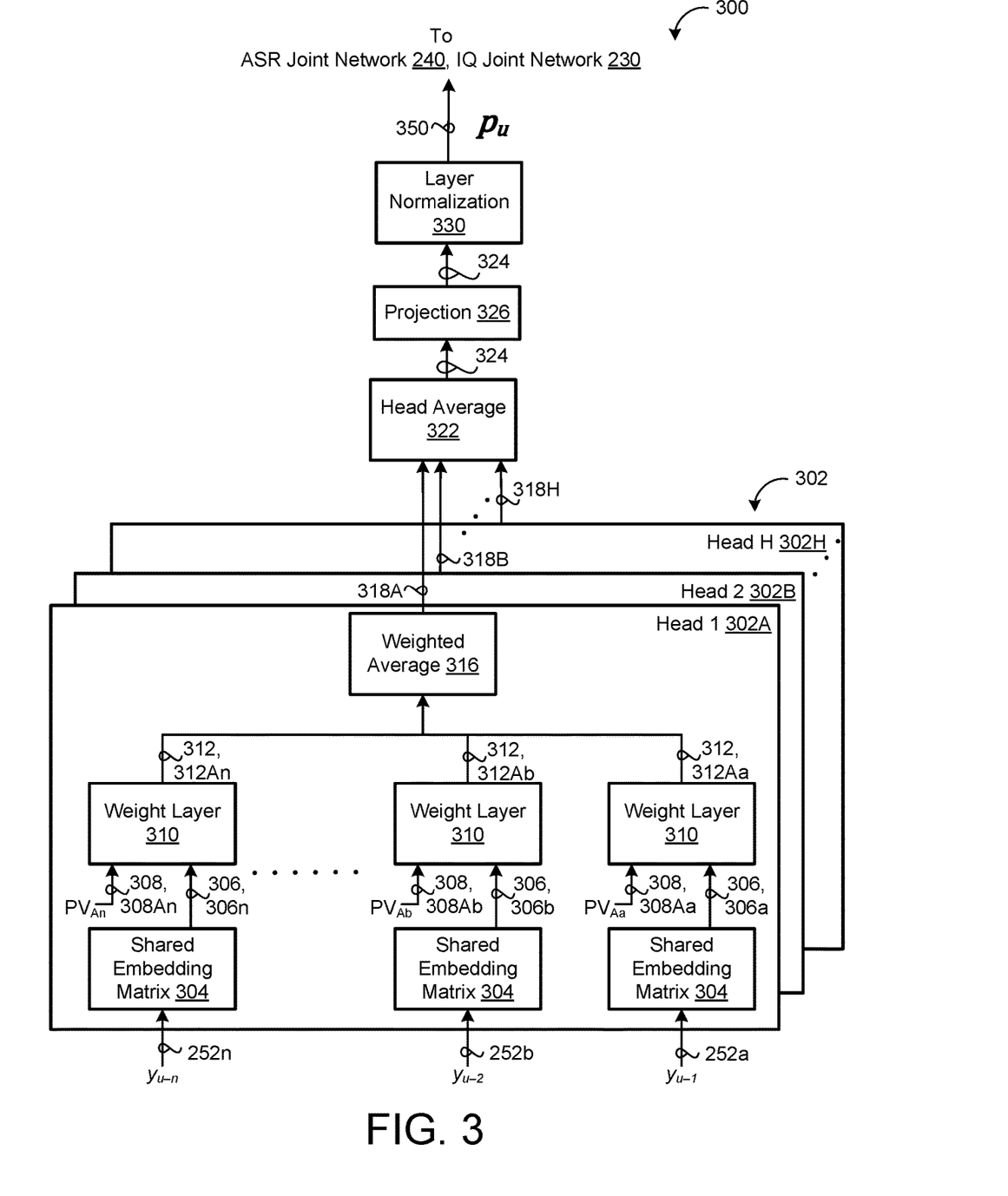
FIG. 3 a schematic view of an example tied and reduced prediction network of the ASR system of FIG. 2.

FIG. 3 shows the prediction network 300 for the RNN-T model 200 that receives, as input, a sequence of non-blank symbols $y_{u-n}, \ldots, y_{u-1}$ that is limited to the N previous non-blank symbols 252a-n output by the final softmax layer 250. In some examples, N is equal to two. In other examples, N is equal to five, however, the disclosure is non-limiting and N may equal any integer. The sequence of non-blank symbols 252a-n may indicate a partial speech recognition result 120a, 120b (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism 302 improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 301 among the sequence of non-blank symbols $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{u-n}, \ldots, y_{u-1}$. The respective position vector PV 308 assigned to each non-blank symbol indicates a position in the history of the sequence of non-blank symbols (e.g., the N previous non-blank symbols output by the final softmax layer 250). For instance, the first position vector $PV_{Aa}$ is assigned to a most recent position in the history, while the last position vector $PV_{An}$ is assigned to a last position in the history of the N previous non-blank symbols output by the final softmax layer 250. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 252a-n, $y_{u-n}, \ldots, y_{u-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $308_{Ba-Bn}, \ldots$, and the $H^{th}$ head 302 H defines another different row of position vectors $PV_{Ha-Hn}$ $308_{Ha-Hn}$.

For each non-blank symbol in the sequence of non-blank symbols 252a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated with the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N} \sum_{h,n} X_n * \sum_e (X_{n,e} * P_{h,n,e}) \quad (1)$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $P_u$ 350 (i.e., label history representation) at the corresponding time step from the plurality of time steps. The prediction network 300 generates only a single embedding vector $P_u$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $P_u$ 350.

Referring back to FIG. 2, the ASR joint network 240 receives the single embedding vector $P_u$ 350 from the prediction network 300, and the audio encoding 224 from the encoder 220. The word piece joint network 240 generates a probability distribution $$y^* = \frac{\mathrm{argmaxlog}}{y} P_{asr}(y \mid x_{t-k}, \ldots, x_t, y_{u-N}, \ldots, y_u)$$

242 over possible speech recognition hypotheses at the corresponding time step. Here, $x_{t-k}, \ldots, x_t$ represents acoustic observations received by the encoder 220 with a context window of k and $y_{u-N}, \ldots, Y_u$ represents word piece sequences. For example, when the natural language is English, the set of output labels may include twenty-seven (27) symbols, e.g., one label for each of the 26-letters in the English alphabet and one label designating a space. Accordingly, the word piece joint network 240 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the word piece joint network 240 can include a posterior probability value for each of the different output labels. Thus, when there are 100 different output labels representing different graphemes or other symbols, the output 242 of the ASR joint network 240 can include 100 different probability values, one for each output label. The probability distribution $$y^* = \frac{\mathrm{argmaxlog}}{y} P_{asr}(y \mid x_{t-k}, \ldots, x_t, y_{u-N}, \ldots, y_u)$$

242 over the possible speech recognition hypotheses indicates a probability for a speech recognition result 120 (FIG. 1). That is, the ASR joint network 240 determines the probability distribution for speech recognition results 120 using the single embedding vector 350 that is based on the sequence of non-blank symbols 252. Stated differently, the ASR joint network 240 generates, at each output step (e.g., time step), a probability distribution 242 over possible speech recognition hypotheses. The probability distribution $y^*$ 242 can then be used to select and assign scores to candidate orthographic elements (e.g., graphemes, word-pieces, and/or words) in a beam search process (e.g., by the softmax layer 250) for determining the transcriptions 120.

The softmax layer 250 may employ any technique to select the output label/symbol with the highest probability in the distribution $y^*$ 242 as the next output symbol $y_u$ 252 predicted by the RNN-T model 200 at the corresponding output step. In this manner, the RNN-T model 200 does not make a conditional independence assumption. Instead, the RNN-T model 200 predicts each symbol conditioned not only on the acoustics but also on the sequence of labels output so far. The RNN-T model 200 does assume an output symbol is independent of future audio data 110, which allows the RNN-T model 200 to be employed in a streaming fashion. In some examples, the softmax layer 250 is composed of a unified word piece or grapheme set that is generated using all unique word pieces or graphemes in a plurality of training data sets.

The IQ joint network 230 generates, based on the higher order feature representation 224 output by the encoder network 220 and the single embedding vector $P_u$ 350 output by the prediction network 300, a probability distribution that the corresponding time step corresponds to an intended query or an unintended query. Stated differently, the IQ joint network 230 can output a set of values indicative of the likelihood of occurrence of each of a predetermined set of output labels including <intended> for an intended query, and <unintended> for an unintended query. This set of values can be a vector and can indicate a probability distribution over the set of output labels. The probability distribution providing the conditional probability of an intended query and the conditional probability of an unintended query can be determined using the following mathematical expressions:

$$P_{intended}^{joint} = P_{iq}(\text{<intended>} \mid x_{t-k}, \ldots, x_t, y_{u-N}, \ldots, y_u) \quad (2)$$

$$P_{unintended}^{joint} = P_{iq}(\text{<unintended>} \mid x_{t-k}, \ldots, x_t, y_{u-N}, \ldots, y_u) \quad (3)$$

where $y_u$ is the output word piece hypothesis with the highest probability 242. The IQ joint network 230 emits tokens 212 (e.g., <intended> and <unintended> tokens) indicating whether or not the spoken utterance includes a query intended for a digital assistant interface 105 when the corresponding probability satisfies (e.g., exceeds) a predefined threshold. For example, when $P_{intended}^{joint}$ satisfies (e.g., exceeds) an intended query threshold an <intended> token 212 is emitted and when $P_{unintended}^{joint}$ satisfies (e.g., exceeds) an unintended threshold an <unintended> token 212 is emitted. The intended threshold and the unintended threshold need not have the same value. Alternatively, when the $P_{intended}^{joint}$ fails to satisfy (e.g., does not exceed) an intended query threshold an <unintended> token 212 is emitted. In some examples, detection of an intended query (e.g., a probability that a corresponding time step corresponds to an intended query satisfies an intended query threshold) triggers the digital assistant 105 to generate and provide a response to the intended query.

With reference to FIGS. 1A, 1B, and 2, in order to ensure the RNN-T 200 produces accurate speech recognition results, a training system 130 (FIGS. 1A and 1B) trains the RNN-T 200 (including the IQ joint network 230) using hybrid autoregressive transducer (HAT) factorization in a two-stage training processing to predict possible sub-word units and two intended query tokens (e.g., <intended> and <unintended>). In some examples, the possible sub-word units include wordpieces (e.g., 4,096 possible wordpieces). In other examples, the RNN-T 200 is trained to predict graphemes, phonemes, whole words, or other types of sub-word units. During a first stage, the training system 130 trains the encoder network 220, the prediction network 300, and the ASR joint network 240 on a speech recognition task to perform speech recognition. In particular, the training system 130 performs the first training stage by optimizing the encoder network 220, the ASR joint network 240, and the prediction network 300 using a regular label sequence of wordpieces. During a second stage, the training system 130 holds the parameters of the encoder network 220, the prediction network 300, and the ASR joint network 240 fixed, while initializing and fine-tuning (e.g., training) the IQ joint network 230 to learn how to detect whether the input utterance includes an intended query. That is, the training system 130 trains the IQ joint network 230 to learn how to predict intended and unintended locations in utterances. The training system 130 trains the IQ joint network 230 using a plurality of transcribed training utterances that have be annotated by, for example, a training data generator 140 (FIG. 1) to include expanded labels (e.g., <intended> and <unintended>) to predict a distribution of <intended> and <unintended> tokens indicating whether the transcribed utterance includes a query intended for a digital assistant. For example, the training data generator 140 can insert <intended> tokens following semantic commands for the digital assistant, and insert <unintended> tokens following wordpieces that do not include semantic commands and/or when a silent pause is determined. Accordingly, while the training system 130 uses a regular label sequence of wordpieces in the first stage, the training data generator 140 generates an expanded label sequence of wordpieces for training the IQ joint network 230 in the second stage.

For short-form utterances that contain a single voice query, the training data generator 140 appends <eos> tokens to the end of each utterance, and inserts <pause> tokens for silence segments determined, for example, using forced alignment. While short-form utterances can be used to model end of speech events and regular short pauses, they may not cover a broader range of possible disfluencies. Moreover, because only a single <eos> token is appended to the end of each utterance, the disfluency detection joint network 210 may learn to stop emitting any additional <eos> tokens after determining a first end of speech event in an utterance, which may cause disfluency detection problems for longer utterances or utterances with multiple disfluencies.

Referring back to FIG. 2, the feature vectors x 222 input to the encoder network 220 may include 80-dimensional log-Mel filter bank features formed by stacking three 25 millisecond (ms) acoustic frames with a 10 ms shift, and downsampling to a 30 ms frame rate. In some examples, the encoder network 220 includes twelve 512-dimensional conformer layers. The conformer layers include causal convolution with a kernel size of 15, and a stack of left-context attention layers with 8-head self-attention. While the encoder network 220 described has a stack of multi-head attention layers/blocks with self-attention that include conformer layers/blocks (e.g., twelve conformer blocks), the present disclosure is not so limited. For instance, the encoder network 220 may include a stack of transformer layers/or a stack of any other type of multi-head attention layers/bocks. The encoder network 220 may include a series of multi-headed self-attention, depth-wise convolutional and feed-forward layers. Alternatively, the encoder network 220 may include a plurality of long-short term memory (LSTM) layers in lieu of multi-head attention layers/blocks.

The prediction network 300 may include an LTSM-based network having an embedding dimension of 320. The dimension $D^{joint}$ of the probability distribution representation 242 output by the ASR joint network 240 may be set to 640. In some examples, the ASR joint network 240 includes hidden units. Additionally or alternatively, the word piece joint network 240 does not include a fully connected (FC) layer. The IQ joint network 230 may include an FC layer with 640 hidden units. Alternatively, the prediction network 300 may include a stack of transformer or conformer blocks (or other type of multi-head attention blocks). The prediction network 300 may also be an embedding look-up table (e.g., a V2 embedding look-up table) to improve latency by outputting looked-up sparse embeddings in lieu of generating hidden representations. In some implementations, the prediction network 300 is a stateless prediction network.

The ASR joint network 240 and the prediction network 300 may collective form an RNN-T decoder of the RNN-T model 200. In some implementations, to further reduce the size of the RNN-T decoder, i.e., the prediction network 300 and the ASR joint network 240, parameter tying between the prediction network 300 and the ASR joint network 240 is applied. Specifically, for a vocabulary size |V| and an embedding dimension $d_e$, the shared embedding matrix 304 at the prediction network 300 is $E \in \mathbb{R}^{|V| \times d_e}$. Meanwhile, a last hidden layer includes a dimension size $d_h$ at the ASR joint network 240, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the ASR joint network 240 includes a weight matrix $[d_h, |V|]$. By having the prediction network 300 to tie the size of the embedding dimension $d_e$ to the dimensionality $d_h$ of the last hidden layer of the ASR joint network 240, the feed-forward projection weights of the ASR joint network 240 and the shared embedding matrix 304 of the prediction network 300 can share their weights for all non-blank symbols via a simple transpose transformation. Since the two matrices share all their values, the RNN-T decoder (i.e., the ASR joint network 240 and the prediction network 300) only needs to store the values once in memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 4A:
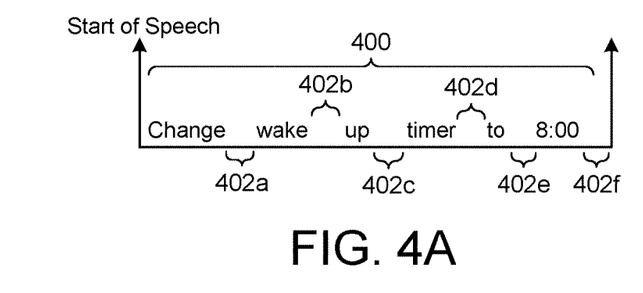
FIG. 4A depicts an example long-form transcribed training utterance.
Figure 4B:
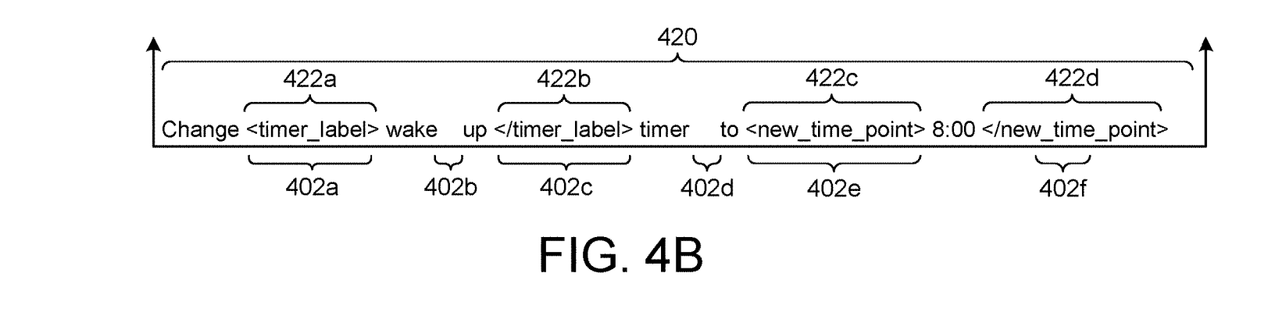
FIG. 4B depicts an example annotated transcribed training utterance for the long-form transcribed training utterance of FIG. 4A.
Figure 4C:
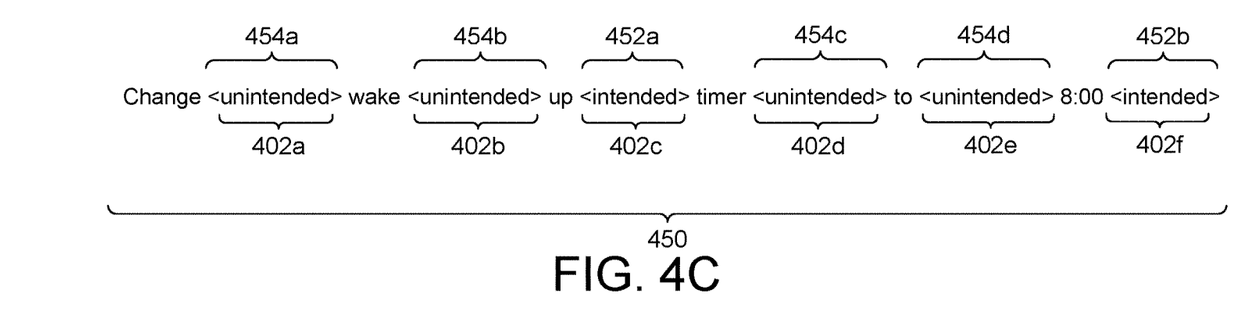

FIG. 4A depicts an example transcribed training utterance 400. FIG. 4B depicts an example semantic annotated transcribed training utterance 420 generated by an NLU model for the transcribed training utterance 400 of FIG. 4A. FIG. 4C depicts an example annotated transcribed training utterance 450 generated by the training data generator 140 for the transcribed training utterance 400 of FIG. 4A. As shown in FIG. 4A, for each utterance, the training data generator 140 determines silence segments 402, 402a-n using, for example, forced alignment. In FIG. 4B, an NLU model parses the transcribed training utterance 400 to determine which of the silence segments 402 constitute slots 422, 422a-n representing a semantic command (e.g., change; wake up; timer to; 8:00) and labels that identify each semantic command as a slot 422. In FIG. 4C, the training data generator 140 labels each of the silence segments 402 (including each slot 422) where a semantic command is completed (e.g., silent pause 402c), with a respective <intended> token (e.g., token 452a), labels silent pauses (e.g., silent pauses 402a, 402b, 402d, and 402e) that do not represent the completion of a common semantic command with respective <unintended> tokens (e.g., tokens 454a, 454b, 454c, 454d), and labels a final silent pause (e.g., silent pause 402f) with an <intended> token (e.g., token 452b).

Figure 5:
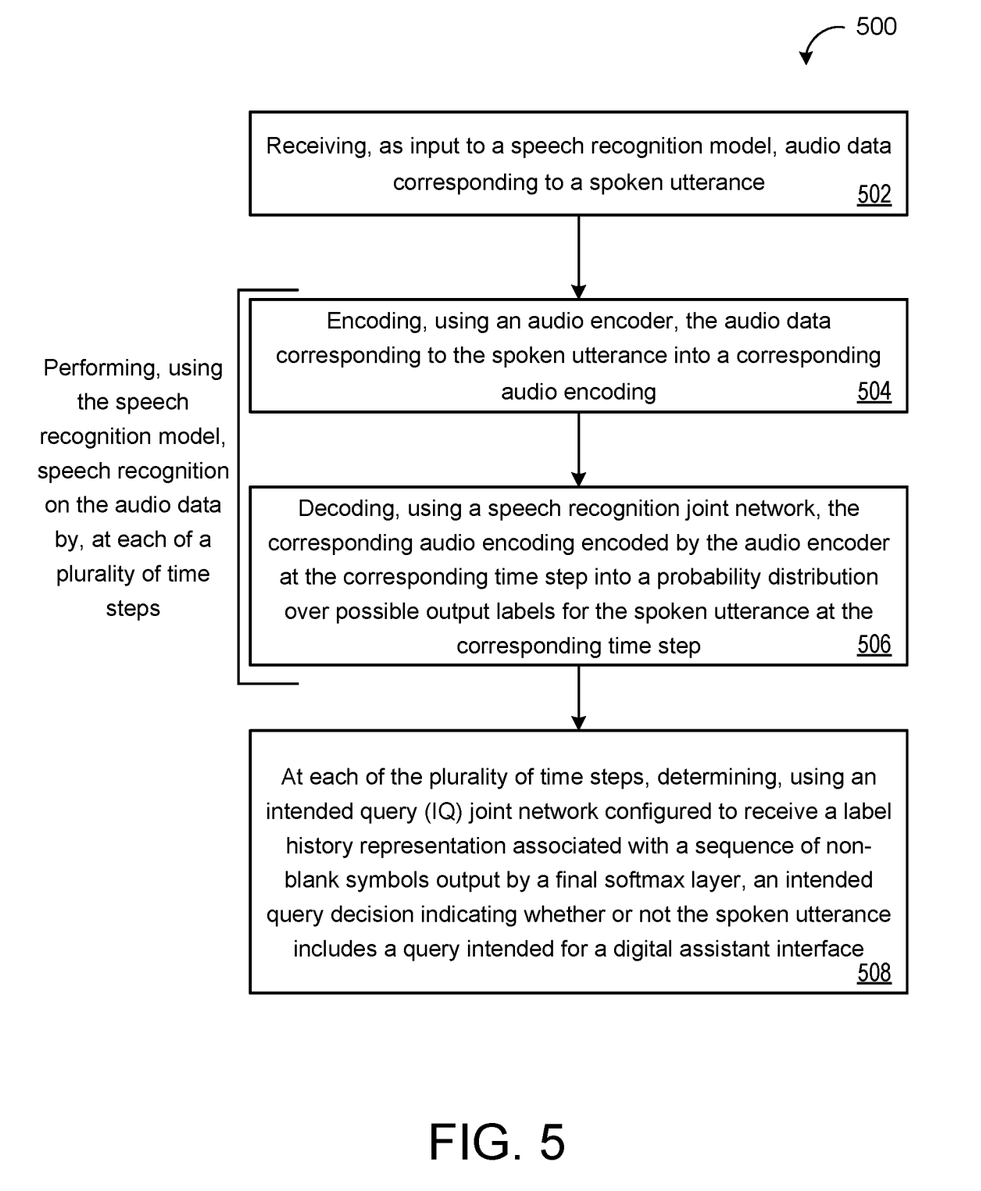
FIG. 5 is a flowchart of an example arrangement of operations for a computer-implemented method of executing an intended query detection model in an ASR system.

FIG. 5 is a flowchart of an exemplary arrangement of operations for a computer-implemented method 500 for detecting intended queries and performing speech recognition. At operation 502, the method 500 includes receiving, as input to a speech recognition model 200, audio data 110, 222) corresponding to a spoken utterance 106. The method 500 also includes performing, using the speech recognition model 200, speech recognition on the audio data 110, 222 by, at each of a plurality of time steps, operations 504 and 506. At operation 504, the method 500 includes encoding, using an audio encoder 220, the audio data 110, 222 corresponding to the spoken utterance 106 into a corresponding audio encoding 224.

At operation 506, the method 500 also includes decoding, using a speech recognition joint network 240, the corresponding audio encoding 224 encoded by the audio encoder 220 at the corresponding time step into a probability distribution 242 over possible output labels for the spoken utterance 106 at the corresponding time step. At each of the plurality of time steps, the method 500 also includes, at operation 508, determining, using an intended query (IQ) joint network 230 configured to receive a label history representation 350 associated with a sequence of non-blank symbols 252 output by a final softmax layer 250, an intended query decision 212 indicating whether or not the spoken utterance 106 includes a query intended for a digital assistant interface 105.

Figure 6:
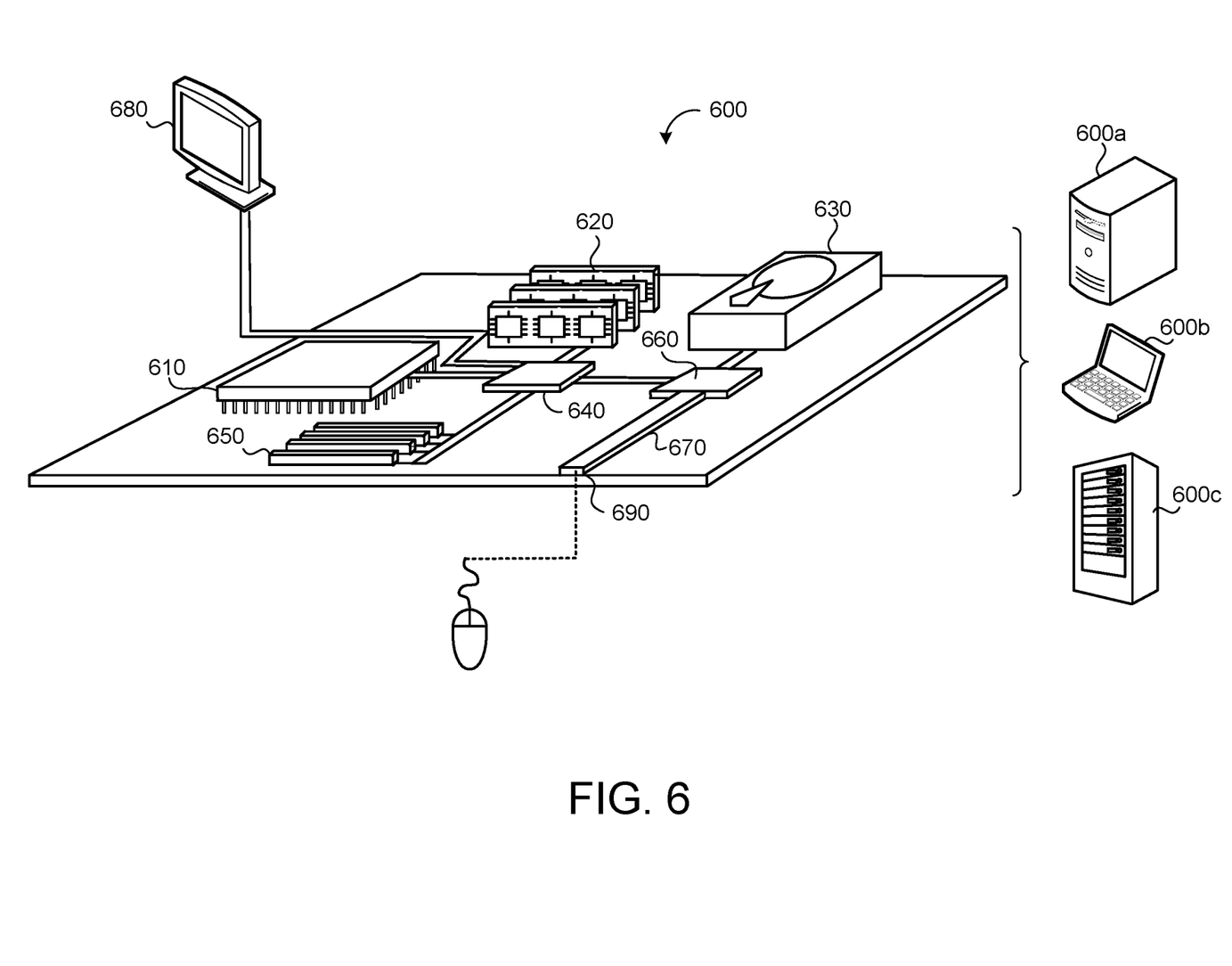
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., data processing hardware 12, 132 of FIGS. 1A and 1B) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 14, 134 of FIGS. 1A and 1B) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
   receiving, as input to a speech recognition model, audio data corresponding to a spoken utterance;
   performing, using the speech recognition model, speech recognition on the audio data by, at each of a plurality of time steps:
      encoding, using an audio encoder, the audio data corresponding to the spoken utterance into a corresponding audio encoding; and
      decoding, using a speech recognition joint network, the corresponding audio encoding encoded by the audio encoder at a corresponding time step into a probability distribution over possible output labels for the spoken utterance at the corresponding time step; and
   at each of the plurality of time steps, determining, using an intended query (IQ) joint network configured to receive a label history representation associated with a sequence of non-blank symbols output by a final softmax layer, an intended query decision indicating whether or not the spoken utterance comprises a query intended for a digital assistant interface.

2. The method of claim 1, wherein:
   the speech recognition model comprises the audio encoder, the speech recognition joint network, and a prediction network, the prediction network configured to receive the sequence of non-blank symbols output by the final softmax layer and generate the label history representation at each of the plurality of time steps;
   the speech recognition model is trained during a first training stage by optimizing the audio encoder, the speech recognition joint network, and the prediction network using a regular label sequence of wordpieces; and
   the IQ joint network is initialized with the speech recognition joint network during a second training stage by freezing the audio encoder and the prediction network and fine-tuning the IQ joint network with an expanded label sequence of both word pieces and IQ tokens to teach the IQ joint network to learn how to predict a distribution of IQ tokens indicating whether or not an input utterance comprises a query intended for the digital assistant interface.

3. The method of claim 2, wherein generating the label history representation for a corresponding sequence of non-blank symbols comprises:
for each non-blank symbol in the sequence of non-blank symbols received as input at each of the plurality of time steps:
generating, by the prediction network, using a shared embedding matrix, an embedding of a corresponding non-blank symbol;
assigning, by the prediction network, a respective position vector to the corresponding non-blank symbol; and
weighting, by the prediction network, the embedding proportional to a similarity between the embedding and the respective position vector; and
generating, as output from the prediction network, a single embedding vector at the corresponding time step, the single embedding vector based on a weighted average of the weighted embeddings, the single embedding vector comprising the label history representation.

4. The method of claim 3, wherein the prediction network comprises a multi-headed attention mechanism, the multi-headed attention mechanism sharing the shared embedding matrix across each head of the multi-headed attention mechanism.

5. The method of claim 1, wherein the audio data corresponding to a spoken utterance is received during a current dialog session between a user and the digital assistant interface.

6. The method of claim 1, wherein the possible output labels comprise wordpieces, words, phonemes, or graphemes.

7. The method of claim 1, wherein the audio encoder comprises a causal encoder comprising one of:
a plurality of unidirectional long short-term memory (LSTM) layers;
a plurality of conformer layers; or
a plurality of transformer layers.

8. The method of claim 1, wherein the speech recognition model is trained using Hybrid Autoregressive Transducer Factorization.

9. The method of claim 1, wherein the operations further comprise, when the intended query decision indicates that the spoken utterance comprises a query intended for the digital assistant interface, providing a response to the received spoken utterance.

10. The method of claim 1, wherein the operations further comprise, when the intended query decision indicates that the spoken utterance does not comprise a query intended for the digital assistant interface, discarding the received spoken utterance.

11. A system comprising:
data processing hardware; and
memory hardware in communication with the data processing hardware, the memory hardware storing instructions that when executed on the data processing hardware cause the data processing hardware to perform operations comprising:
receiving, as input to a speech recognition model, audio data corresponding to a spoken utterance;
performing, using the speech recognition model, speech recognition on the audio data by, at each of a plurality of time steps:
encoding, using an audio encoder, the audio data corresponding to the spoken utterance into a corresponding audio encoding; and
decoding, using a speech recognition joint network, the corresponding audio encoding encoded by the audio encoder at a corresponding time step into a probability distribution over possible output labels for the spoken utterance at the corresponding time step; and
at each of the plurality of time steps, determining, using an intended query (IQ) joint network configured to receive a label history representation associated with a sequence of non-blank symbols output by a final softmax layer, an intended query decision indicating whether or not the spoken utterance comprises a query intended for a digital assistant interface.

12. The system of claim 11, wherein:
the speech recognition model comprises the audio encoder, the speech recognition joint network, and a prediction network, the prediction network configured to receive the sequence of non-blank symbols output by the final softmax layer and generate the label history representation at each of the plurality of time steps;
the speech recognition model is trained during a first training stage by optimizing the audio encoder, the speech recognition joint network, and the prediction network using a regular label sequence of wordpieces; and
the IQ joint network is initialized with the speech recognition joint network during a second training stage by freezing the audio encoder and the prediction network and fine-tuning the IQ joint network with an expanded label sequence of both word pieces and IQ tokens to teach the IQ joint network to learn how to predict a distribution of IQ tokens indicating whether or not an input utterance comprises a query intended for the digital assistant interface.

13. The system of claim 12, wherein generating the label history representation for a corresponding sequence of non-blank symbols comprises:
for each non-blank symbol in the sequence of non-blank symbols received as input at each of the plurality of time steps:
generating, by the prediction network, using a shared embedding matrix, an embedding of a corresponding non-blank symbol;
assigning, by the prediction network, a respective position vector to the corresponding non-blank symbol; and
weighting, by the prediction network, the embedding proportional to a similarity between the embedding and the respective position vector; and
generating, as output from the prediction network, a single embedding vector at the corresponding time step, the single embedding vector based on a weighted average of the weighted embeddings, the single embedding vector comprising the label history representation.

14. The system of claim 13, wherein the prediction network comprises a multi-headed attention mechanism, the multi-headed attention mechanism sharing the shared embedding matrix across each head of the multi-headed attention mechanism.

15. The system of claim 11, wherein the audio data corresponding to a spoken utterance is received during a current dialog session between a user and the digital assistant interface.

16. The system of claim 11, wherein the possible output labels comprise wordpieces, words, phonemes, or graphemes.

17. The system of claim 11, wherein the audio encoder comprises a causal encoder comprising one of:
- a plurality of unidirectional long short-term memory (LSTM) layers;
- a plurality of conformer layers; or
- a plurality of transformer layers.

18. The system of claim 11, wherein the speech recognition model is trained using Hybrid Autoregressive Transducer Factorization.

19. The system of claim 11, wherein the operations further comprise, when the intended query decision indicates that the spoken utterance comprises a query intended for the digital assistant interface, providing a response to the received spoken utterance.

20. The system of claim 11, wherein the operations further comprise, when the intended query decision indicates that the spoken utterance does not comprise a query intended for the digital assistant interface, discarding the received spoken utterance.

* * * * *